US010708077B2

(12) United States Patent
Cui et al.

(10) Patent No.: US 10,708,077 B2
(45) Date of Patent: Jul. 7, 2020

(54) TECHNOLOGIES FOR OPTIMALLY INDIVIDUALIZED BUILDING AUTOMATION

(71) Applicant: ABB Schweiz AG, Baden (CH)

(72) Inventors: Tao Cui, Princeton, NJ (US); Joseph A. Carr, Raleigh, NC (US); Alexander Brissette, Raleigh, NC (US); David Coats, Apex, NC (US)

(73) Assignee: ABB Schweiz AG, Bade (CH)

( * ) Notice: Subject to any disclaimer, the term of this patent is extended or adjusted under 35 U.S.C. 154(b) by 0 days.

(21) Appl. No.: 15/820,057

(22) Filed: Nov. 21, 2017

(65) Prior Publication Data

US 2019/0158305 A1 May 23, 2019

(51) Int. Cl.
| | |
|---|---|
| H04L 12/28 | (2006.01) |
| G05B 15/02 | (2006.01) |
| F24F 11/58 | (2018.01) |
| F24F 11/63 | (2018.01) |
| F24F 11/54 | (2018.01) |

(Continued)

(52) U.S. Cl.
CPC .......... *H04L 12/2816* (2013.01); *F24F 11/54* (2018.01); *F24F 11/58* (2018.01); *F24F 11/63* (2018.01); *G05B 15/02* (2013.01); *H04L 12/2825* (2013.01); *H04L 12/2834* (2013.01); *F24F 2120/14* (2018.01); *F24F 2120/20* (2018.01); *G05B 2219/25011* (2013.01);
(Continued)

(58) Field of Classification Search
CPC ............. H04L 12/2816; H04L 12/2834; H04L 12/3825; F24F 11/58; F24F 11/63; F24F 11/54; G05B 15/02
See application file for complete search history.

(56) References Cited

U.S. PATENT DOCUMENTS

| 7,987,247 B2 | 7/2011 | Westphal et al. |
| 2012/0158552 A1* | 6/2012 | Smith ................ G06Q 30/0629 705/27.2 |

(Continued)

FOREIGN PATENT DOCUMENTS

WO 2014124353 A1 8/2014

OTHER PUBLICATIONS

Mark Feldmeier and Joseph A. Paradisco, "Personalized HVAC Control System," Institute of Electrical and Elctronics Engineers (IEEE) publication, 2010, Ref. 978-1-4244-7414-1/10, United States (8 pages).

(Continued)

*Primary Examiner* — Mohammad Ali
*Assistant Examiner* — Vincent W Chang
(74) *Attorney, Agent, or Firm* — Taft Stettinius & Hollister LLP; J. Bruce Schelkopf

(57) ABSTRACT

A method for a building automation system to control a comfort level in a building includes tracking a building occupant's activity data using a wearable activity tracker. A smartphone is coupled to the wearable activity tracker. Activity data is collected from the wearable activity tracker using a smartphone app operating on the building occupant's smartphone, and a comfort value is determined using the smartphone app based on the activity data. A report of the comfort value is transmitted to a building automation system (BAS) app from the smartphone, and the output of a building system is controlled based on the comfort value.

21 Claims, 7 Drawing Sheets

(51) Int. Cl.
*G06F 1/16* (2006.01)
*F24F 120/14* (2018.01)
*F24F 120/20* (2018.01)

(52) U.S. Cl.
CPC ........ *G06F 1/163* (2013.01); *H04L 2012/285* (2013.01); *H04L 2012/2841* (2013.01)

(56) References Cited

U.S. PATENT DOCUMENTS

| | | |
|---|---|---|
| 2014/0018940 A1 | 1/2014 | Casilli |
| 2014/0207292 A1 | 7/2014 | Ramagem et al. |
| 2014/0277756 A1* | 9/2014 | Bruce .................... G05D 22/02 700/276 |
| 2014/0277765 A1 | 9/2014 | Karimi et al. |
| 2016/0003493 A1 | 1/2016 | Katz |
| 2016/0054023 A1 | 2/2016 | Baker et al. |
| 2016/0252267 A1* | 9/2016 | Davalos ................ G05B 15/02 700/276 |
| 2016/0370773 A1 | 12/2016 | Mousavi et al. |
| 2017/0269617 A1* | 9/2017 | Daoud ..................... F24F 11/30 |
| 2018/0204162 A1* | 7/2018 | Endel ............... G06Q 10/06315 |
| 2018/0266716 A1* | 9/2018 | Bender ................... F24F 11/63 |
| 2019/0180493 A1* | 6/2019 | Tong ..................... A63B 69/00 |

OTHER PUBLICATIONS

COMFY Product Brochure, https://comfyapp.com dated Jun. 28, 2016, 2016 Building Robotics, Inc. (4 pages).
ASHRAE, American Society of Heating, Refrigerating and Air-Conditioning Engine, ANSI/ASHRAE Standard 55-2013, "Thermal Environmental Conditions for Human Occupancy," 2013, United States (58 pages).
Wikipedia definition of "Activity Tracker", https://en.wikipedia.org/wiki/Activity_tracker, Jun. 28, 2016, (2 pages).

* cited by examiner

TECHNOLOGIES FOR OPTIMALLY INDIVIDUALIZED BUILDING AUTOMATION

TECHNICAL FIELD

The present application generally relates to a building automation system and more particularly, but not exclusively, to methods and systems for controlling comfort in a building.

BACKGROUND

Building automation systems typically use a network of fixed sensors installed throughout a building to monitor the building and control building systems. The costs associated with installing fixed sensors and the lack of retrofit ability for existing buildings may hinder the widespread adoption of building automation solutions. Additionally, fixed sensors may require extensive recalibration over large areas of building infrastructure, which may render the original costs of the fixed sensors as a sunk cost.

SUMMARY

One embodiment of the present invention is a unique method for a building automation system to control a comfort level in a building. Another embodiment is unique system for controlling comfort in a building having a heating, ventilation and air conditioning system. Another embodiment is a unique method for controlling the comfort level in a building. Other embodiments include apparatuses, systems, devices, hardware, methods, and combinations for controlling comfort in a building. Further embodiments, forms, features, aspects, benefits, and advantages of the present application shall become apparent from the description and figures provided herewith.

BRIEF DESCRIPTION OF THE FIGURES

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE ILLUSTRATIVE EMBODIMENTS

Figure 1:
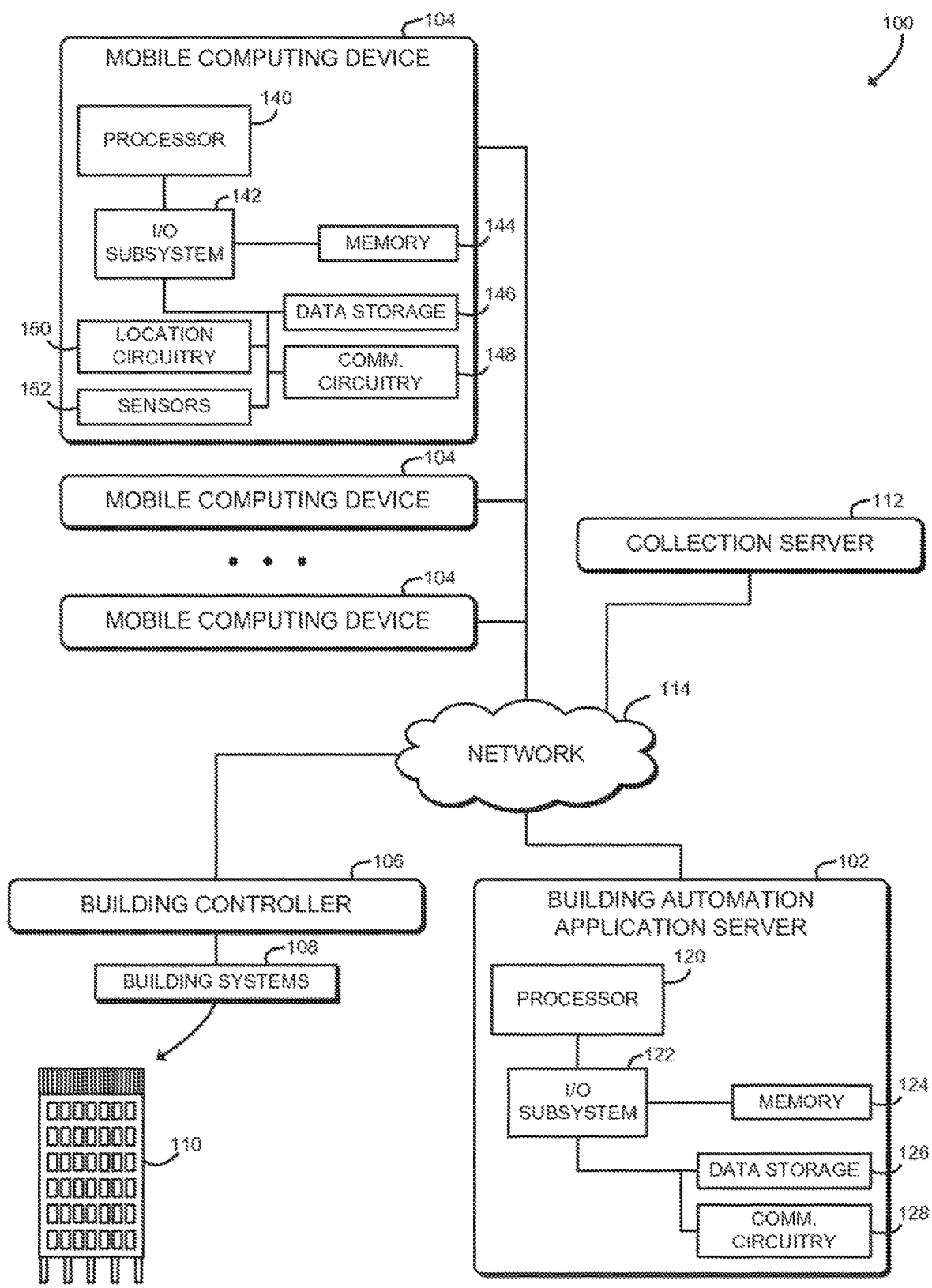
FIG. 1 is a simplified block diagram of at least one embodiment of a system for individualized building automation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for individualized building automation includes a building automation application server 102, several mobile computing devices 104, a building controller 106, and a collection server 112 in communication over a network 114. In use, as described in more detail below, the building controller 106 controls one or more building systems 108 (e.g., heating, ventilation, and/or air conditioning (HVAC) systems, lighting systems, safety systems, security systems, access control systems, wireless network systems, vending machine systems, electronic system controllers, programmable logic controllers, etc.) associated with a building 110. Each of the mobile computing devices 104 monitors one or more sensors to generate time- and geo-tagged individualized sensor data. The individualized sensor data may include environmental sensor data such as temperature, relative humidity, pressure, occupancy data, or any other data that may be used to control one or more of the building systems 108. The mobile computing devices 104 transmit the individualized sensor data to the building automation application server 102, which uses the individualized sensor data to fine-tune and/or optimize the configuration and settings of one or more of the building systems 108. Of course, in some embodiments, the building automation application server 102 may poll an approved list of mobile computing devices 104 and/or other systems to receive the individualized sensor data. The building automation application server 102 configures the building controller 106 with the updated building system configuration. The mobile computing devices 104 and/or the building automation application server 102 may limit monitoring to mobile computing devices 104 that are within or nearby the building 110. Essentially, the system 100 uses individual users as distributed sensors, and thus by using sensors and devices already carried by many people, the system 100 may reduce costs and improve sensor coverage compared to using fixed sensors for building automation applications in existing and new buildings 110. Additionally, by monitoring data from many devices, the system 100 may provide more accurate and individualized building system control, allowing for individualized occupant experience, preference, and comfort. Additionally, by using redundant sensor data from many devices, sensor accuracy requirements may be relaxed by leveraging sensor fusion techniques to fill gaps in the data and reject bad data. The redundant sensor data from many devices may also provide mitigation against cyber-attacks and data compromise.

The building automation application server 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the building automation application server 102 illustratively includes a processor 120, an input/output subsystem 122, a memory 124, a data storage device 126, and communication circuitry 128. Of course, the building automation application server 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments. Additionally, in some embodiments, the building automation application server 102 may be embodied as a "virtual server" formed from multiple computing devices distributed across the network 114 and operating in a public or private cloud. Accordingly, although the building automation application server 102 is illustrated in FIG. 1 as embodied as a single server computing device, it should be appreciated that the building automation application server 102 may be embodied as multiple devices cooperating together to facilitate the functionality described below.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the building automation application server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the building automation application server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the building automation application server 102 may be embodied as any communication circuit, device, or collection thereof, capable of enabling communications between the building automation application server 102, the mobile computing devices 104, the building controller 106, the collection server 112, and/or other remote devices over the network 114. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Each mobile computing device 104 is configured to transmit individualized sensor data, which may be based on sensor data or user input data captured by the mobile computing device 104, to the building automation application server 102 as described further below. The mobile computing device 104 may be embodied as any type of computation or computer device capable of performing the functions described herein, including, without limitation, a smart phone, a tablet computer, a wearable computing device, a notebook computer, a laptop computer, a computer, a multiprocessor system, a desktop computer, a server, a network appliance, an in-vehicle infotainment system, a web appliance, a distributed computing system, a processor-based system, and/or a consumer electronic device. Illustratively, the mobile computing device 104 includes a processor 140, an I/O subsystem 142, a memory 144, a data storage device 146, communication circuitry 148, and/or other components and devices commonly found in a smart phone or similar computing device (e.g., a touchscreen display or other I/O devices). Those individual components of the mobile computing device 104 may be similar to the corresponding components of the building automation application server 102, the description of which is applicable to the corresponding components of the mobile computing device 104 and is not repeated herein so as not to obscure the present disclosure.

The mobile computing device 104 further includes location circuitry 150 and sensors 152. The location circuitry 150 of the mobile computing device 104 may be embodied as any type of circuit capable of determining the precise or approximate position of the mobile computing device 104. For example, the location circuitry 150 may be embodied as a global positioning system (GPS) receiver, capable of determining the precise coordinates of the mobile computing device 104. Additionally or alternatively, the location circuitry 150 may be embodied as a local positioning system receiver capable of determining the position of the mobile computing device 104 using wireless beacons with known positions. In other embodiments, the location circuitry 150 may triangulate or trilaterate the position of the mobile computing device 104 using distances or angles to cellular network towers or other network transceivers with known positions, provided by the communication circuitry 148. In other embodiments, the location circuitry 150 may determine the approximate position of the mobile computing device 104 based on association to wireless networks with known positions, using the communication circuitry 148.

The sensors 152 may be embodied as any electronic device or devices usable to collect information that may be used to control the building systems 108, including information relevant to occupancy, occupant comfort, safety, security, or other building systems 108. The sensors 152 may include sensors typically included in a smart phone or other mobile device, such as motion or position sensors (e.g., accelerometers, gyroscopes, magnetic compasses, and other motion/position sensors), audio sensors, cameras, proximity sensors, ambient light sensors, touch input sensors, or similar sensors. In some embodiments, the sensors 152 may include sensors capable of measuring the environment of the mobile computing device 104, including sensors capable of measuring temperature, humidity, light levels, or other environmental sensors. The sensors 152 may also include "soft" or "fusion" sensors that generate information that is calculated or otherwise derived from sensor data produced by one or more other sensors 152 and/or from other information sources, such as user input. In some embodiments, the sensors 152 may include external sensor devices in communication with the mobile computing device 104, such as sensor devices (e.g., thermometers, humidity sensors, etc.) that communicate with the mobile computing device 104 using a personal area network technology such as Bluetooth® Low Energy.

The building controller 106 is configured to control one or more building systems 108 associated with the building 110. The building controller 106 may be embodied as any type of computation or computer device capable of performing the functions described herein, including, without limitation, a computer, a multiprocessor system, a server, a rack-mounted server, a blade server, a programmable logic controller, an embedded controller, an embedded system, a processor-based system, and/or a consumer electronic device. Thus, the building controller 106 may include a processor, an I/O subsystem, a memory, a data storage device, communication circuitry, and/or other components and devices commonly found in a computer or similar computing device. Those individual components of the building controller 106 may be similar to the corresponding components of the building automation application server 102 and/or the mobile computing device 104 and are not illustrated so as not to obscure the present disclosure. Additionally, although the building controller 106 is illustrated in FIG. 1 as embodied as a single computing device, it should be appreciated that the building controller 106 may be embodied as multiple devices (e.g., a network of building controllers 106 or a hierarchy of building controllers 106) cooperating together to control the building systems 108 and otherwise facilitate the functionality described below. In some embodiments (not shown) the building controller 106 and the building automation application server 102 may both be embodied in the same physical server device or collection of devices.

The building systems 108 may include any electronically or electromechanically controllable systems associated with the building 110 or collection of buildings 110. For example, the building systems 108 may include heating, ventilation, and air conditioning (HVAC) systems or other environmental comfort systems, lighting systems, security systems, safety systems, access control systems, electronic system controllers, programmable logic controllers, and other building systems. The building 110 may be embodied as a commercial building, a residential building, a multi-dwelling building, a high-rise building, or any other building associated with the building systems 108. Additionally, although illustrated as a building 110, it should be understood that the technologies of this disclosure may be applied to control systems for other occupied structures, spaces, or machines, such as vehicles.

The collection server 112 is configured to collect individualized sensor data produced by the mobile computing devices 104 and provide the individualized sensor data to the building automation application server 102. The collection server 112 may be embodied as any type of computation or computer device capable of performing the functions described herein, including, without limitation, a computer, a multiprocessor system, a server, a rack-mounted server, a blade server, a programmable logic controller, an embedded controller, an embedded system, a processor-based system, and/or a consumer electronic device. For example, the collection server 112 may be embodied as a web server accessible over a public network (e.g., a cloud server). Additionally or alternatively, the collection server 112 may be embodied as a local gateway device accessible over a local area network or other network associated with the building 110. In some embodiments, the collection server 112 may be embodied as or otherwise connected to one or more personal area network beacon devices (e.g., Bluetooth® Low Energy beacons) located in the building 110. Thus, the collection server 112 may include a processor, an I/O subsystem, a memory, a data storage device, communication circuitry, and/or other components and devices commonly found in a computer or similar computing device. Those individual components of the collection server 112 may be similar to the corresponding components of the building automation application server 102 and/or the mobile computing device 104 and are not illustrated so as not to obscure the present disclosure. Additionally, in some embodiments, the collection server 112 may be embodied as a "virtual server" formed from multiple computing devices distributed across the network 114 and operating in a public or private cloud. Accordingly, although the collection server 112 is illustrated in FIG. 1 as embodied as a single server computing device, it should be appreciated that the collection server 112 may be embodied as multiple devices cooperating together to facilitate the functionality described below. In some embodiments (not shown) the collection server 112 and the building automation application server 102 may both be embodied in the same physical server device or collection of devices.

As discussed in more detail below, the building automation application server 102, the mobile computing device 104, the building controller 106, and the collection server 112 may be configured to transmit and receive data with each other and/or other devices of the system 100 over the network 114. The network 114 may be embodied as any number of various wired and/or wireless networks. For example, the network 114 may be embodied as, or otherwise include, a wired or wireless local area network (LAN), a wired or wireless wide area network (WAN), a cellular network, and/or a publicly-accessible, global network such as the Internet. As such, the network 114 may include any number of additional devices, such as additional computers, routers, and switches, to facilitate communications among the devices of the system 100.

Figure 2:
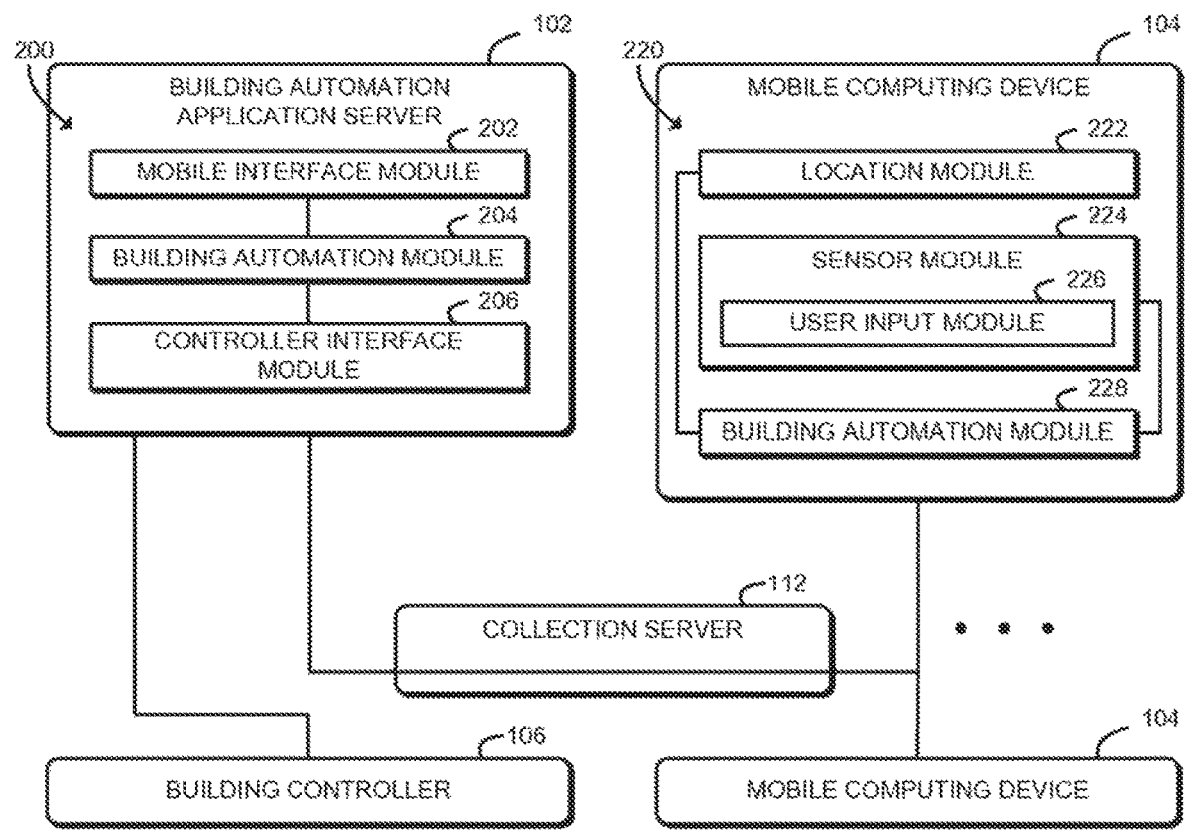
FIG. 2 is a simplified block diagram of at least one embodiment of various environments that may be established by the system of FIG. 1.

Referring now to FIG. 2, in an illustrative embodiment, the building automation application server 102 establishes an environment 200 during operation. The illustrative environment 200 includes a mobile interface module 202, a building automation module 204, and a controller interface module 206. The various modules of the environment 200 may be embodied as hardware, firmware, software, or a combination thereof. For example the various modules, logic, and other components of the environment 200 may form a portion of, or otherwise be established by, the processor 120 or other hardware components of the building automation application server 102. As such, in some embodiments, any one or more of the modules of the environment 200 may be embodied as a circuit or collection of electrical devices (e.g., a mobile interface circuit, a building automation circuit, etc.).

The mobile interface module 202 is configured to receive individualized sensor data from the mobile computing devices 104. The individualized sensor data is indicative of the location of each mobile computing device 104 and a building system control parameter measured or otherwise determined by the mobile computing device 104. For example, the individualized sensor data may be indicative of the environment at the location of the mobile computing device 104 or may be based on user input to the mobile computing device 104. The user input to the mobile computing device 104 may be received, for example, in response to surveys querying occupants about their comfort level, sent randomly to a small number of occupants (e.g., less than 5% of occupants) at various times during the day. The mobile interface module 202 may be further configured to transmit feedback data to the mobile computing device in response to configuring the building controller 106, as further described below. The mobile interface module 202 may be configured to receive the individualized sensor data and/or transmit the feedback data via the collection server 112.

The building automation module 204 is configured to determine a building system configuration based on the individualized sensor data. The building automation module 204 may be configured to optimize the building system configuration for cost, efficiency, or comfort based on the individualized sensor data. In some embodiments, the building automation module 204 may be configured to receive fixed sensor data from one or more fixed sensors throughout the building 110. For example, the fixed sensors may be included in one or more existing building systems, such as wireless networks (e.g., wireless access points), security systems, vending systems, or other systems. The building system configuration may also be determined based on the fixed sensor data.

The controller interface module 206 is configured to configure the building controller 106 based on the building system configuration determined based on the individualized sensor data. The building controller 106 controls one or more building systems 108 based on the building system configuration. For example, the building controller 106 may configure setpoints, enable systems, or otherwise control the building systems 108 as defined by the building system configuration.

Still referring to FIG. 2, in the illustrative embodiment, each mobile computing device 104 establishes an environment 220 during operation. The illustrative environment 220 includes a location module 222, a sensor module 224, and a building automation module 228. The various modules of the environment 220 may be embodied as hardware, firmware, software, or a combination thereof. For example the various modules, logic, and other components of the environment 220 may form a portion of, or otherwise be established by, the processor 140 or other hardware components of the mobile computing device 104. As such, in some embodiments, any one or more of the modules of the environment 220 may be embodied as a circuit or collection of electrical devices (e.g., a location circuit, a sensor circuit, etc.).

The location module 222 is configured to determine the location of the mobile computing device 104. For example, the location module 222 may be configured to determine the location of the mobile computing device 104 using the location circuitry 150 and/or using the communication circuitry 148. In some embodiments, the location module 222 may be configured to determine whether the mobile computing device 104 is located at the building 110 or within a certain part of the building 110 (e.g., a room, floor, zone, etc.).

The sensor module 224 is configured to receive sensor data from the sensors 152 of the mobile computing device 104. The sensor data is indicative of a building system control parameter. In some embodiments, the sensor module 224 may be configured to receive environmental sensor data. In some embodiments, the sensor module 224 may be configured to monitoring user input for data that is indicative of a user sentiment regarding a building system 108 (e.g., monitoring for a message stating, "It's too cold in here" or similar). In some embodiments, those functions may be performed by one or more sub-modules, such as a user input module 226.

The building automation module 228 is configured to generate individualized sensor data that is indicative of the location of the mobile computing device 104, the current time, and the sensor data received from the sensors 152. The building automation module 228 is further configured to transmit the individualized sensor data to the building automation application server 102. The building automation module 228 may be configured to determine whether to upload the individualized sensor data, for example based on the device location or on user privacy preferences. The building automation module 228 may be configured to receive feedback data from the building automation application server 102 that is indicative of a building system configuration that has been applied to the building 110. In some embodiments, the building automation module 228 may be configured to transmit the individualized sensor data and/or receive the feedback data via the collection server 112.

Figure 3:
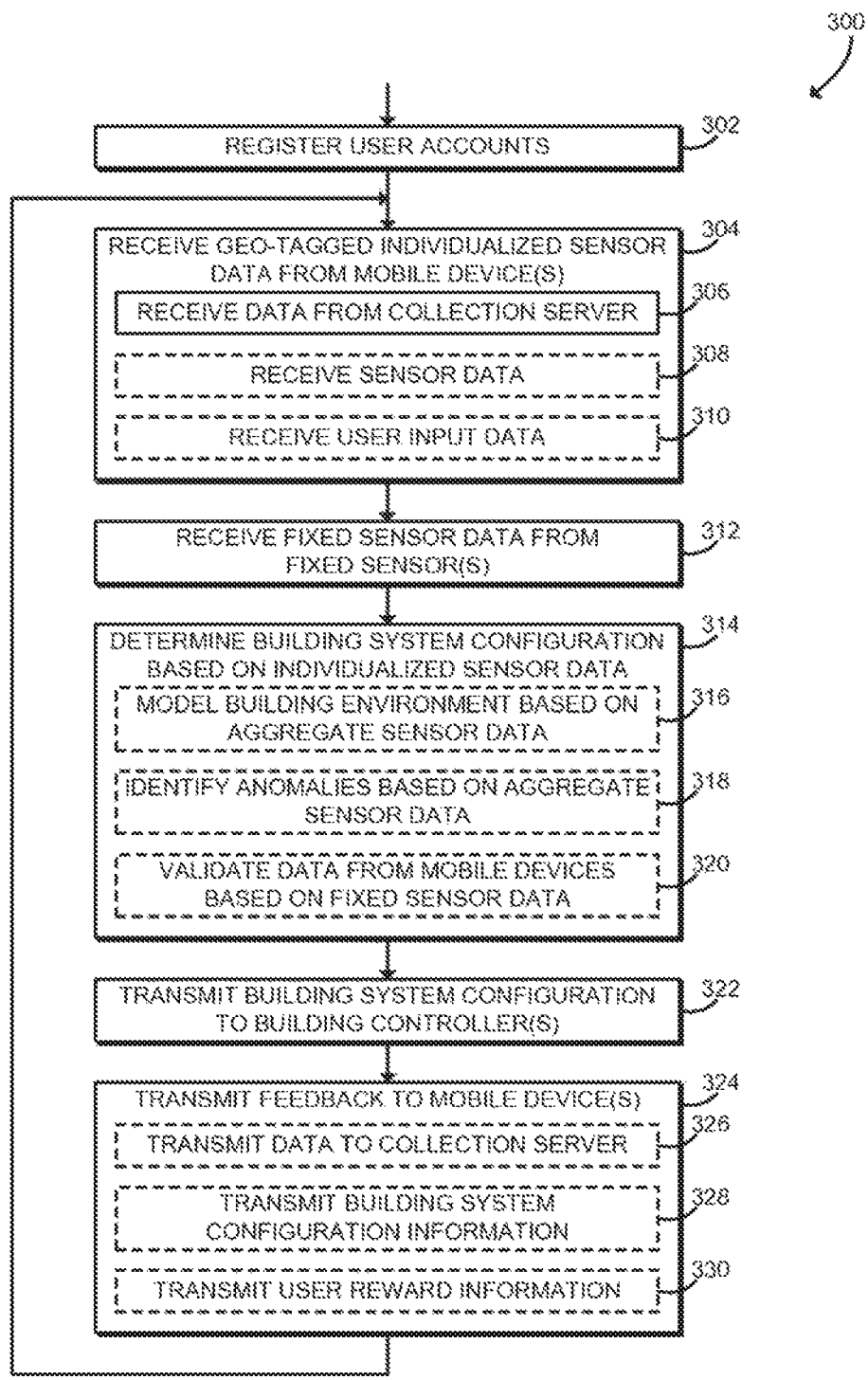
FIG. 3 is a simplified flow diagram of at least one embodiment of a method for individualized building automation that may be executed by a building automation server of the system of FIGS. 1 and 2.

Referring now to FIG. 3, in use, the building automation application server 102 may execute a method 300 for individualized building automation. The method 300 begins with block 302, in which the building automation application server 102 registers one or more user accounts associated with the mobile computing devices 104. As part of the registration process, the building automation application server 102 may record privacy preferences associated with each user account. For example, the privacy preferences may indicate whether a user has opted out of providing sensor data to the building automation application server 102 or whether the user has agreed to a privacy policy.

In block 304, the building automation application server 102 receives geo- and time-tagged individualized sensor data from one or more of the mobile computing devices 104. The individualized sensor data is geo-tagged, meaning that it includes or is otherwise associated with geographical data indicating the location of the associated mobile computing device 104. The geographical data may indicate the location of the mobile computing device 104 at any appropriate resolution. For example, in some embodiments, the geographical data may indicate whether the mobile computing device 104 is located at or within the building 110. Additionally or alternatively, the geographical data may identify particular rooms, zones, or other areas within the building 110. The individualized sensor data may be embodied as any data that may be used to control the building systems 108. For example, the individualized sensor data may be used as a parameter, input, or other reference to one or more control algorithms. As a further example, the individualized sensor data may be embodied as time-coded temperature measurements or other environmental sensor measurements that may be used to control a heating, ventilation, and air conditioning (HVAC) system.

In block 306, the building automation application server 102 receives the individualized sensor data from the collection server 112. The collection server 112 may be embodied as a web server, a cloud server, or other server accessible to the building automation application server 102 using a public network such as the Internet. Additionally or alternatively, the collection server 112 may be embodied as a gateway device or other computing device accessible to the building automation application server 102 using a local area network associated with the building 110. In some embodiments, the collection server 112 may be embodied as or coupled with a personal area network beacon device such as a Bluetooth® Low Energy beacon located within the building 110.

In some embodiments, in block 308 the building automation application server 102 may receive individualized sensor data that includes or was generated from sensor data collected by the mobile computing device 104. For example, the building automation application server 102 may receive sensor data indicative of the environment of the mobile computing device 104, such as audio data, visual/camera data, temperature data, humidity data, light level data, or other environmental data. In some embodiments, in block 310 the building automation application server 102 may receive individualized sensor data that includes or was generated from user input data received by the mobile computing device 104. For example, the building automation application server 102 may receive user preferences or settings input by the user into a building automation application. In some embodiments, individualized sensor data may be indicative of a user sentiment expressed by the user in the user input. For example, the user may input text or images regarding the user's current comfort level (e.g., text indicating the current temperature). The building automation application server 102 and/or the mobile computing device 104 may parse or otherwise analyze the user input to determine user sentiment.

In block 312, the building automation application server 102 may receive fixed sensor data from one or more fixed sensors positioned in the building 110. For example, the building automation application server 102 may receive temperature data, humidity data, light level data, or other sensor data indicative of the environment of the building 110. The building automation application server 102 may communicate with the fixed sensors using an existing building automation communication system (e.g., an existing wired network, wireless network, or other communication system).

In block 314, the building automation application server 102 determines a building system configuration for the building systems 108 based on the individualized sensor data. The building automation application server 102 may determine one or more configuration settings, setpoints, on/off status, or other controllable parameters of the building systems 108. The building automation application server 102 may determine the building system configuration to tune the building controller 106 to achieve a desired outcome in terms of cost, energy efficiency, occupant comfort, and/or a combination of those factors. Individualized sensor data received from multiple mobile computing devices 104 may provide much more thorough and complete data regarding the occupied parts of the building 110 when compared to the data received from fixed sensors alone. By incorporating the individualized sensor data received from multiple mobile computing devices 104, the building automation application server 102 may optimally individualize the building system configuration for the individual users associated with the mobile computing devices 104. Thus, the building automation application server 102 may determine a building system configuration to provide a more optimal balance of comfort and energy efficiency that is individualized to each user.

In some embodiments, in block 316 the building automation application server 102 may model or otherwise measure the environment of the building 110 based on the aggregate individualized sensor data received from the mobile computing devices 104 and/or the fixed sensor data received from the fixed sensors. For example, the building automation application server 102 may use distributed majority algorithms to accurately determine the temperature, humidity, light level, or other environmental factors for the building 110 or for parts of the building 110. As another example, the building automation application server 102 may determine whether particular parts of the building 110 are occupied based on the individualized sensor data. The building automation application server 102 may optimize or otherwise determine comfort setpoints (e.g., desired temperature or humidity) for parts of the building 110 based on the preferences of users associated with mobile computing devices 104 located within those parts of the building 110. Similarly, the building automation application server 102 may optimize or otherwise determine building system 108 settings or other settings required to achieve those setpoints. For example, the building automation application server 102 may use a heat transfer model to determine coverage of a desired temperature in a part of the building 110 and how quickly or slowly the change takes effect. Such data may be used to improve the efficiency of the building systems 108 (e.g., by improving the placement of vents).

In block 318, the building automation application server 102 may identify any anomalies in the individualized sensor data based on the aggregate individualized sensor data. The building automation application server 102 may, for example, identify individualized sensor data that exceeds particular expected limits (e.g., expected temperature or humidity limits). The building automation application server 102 may disregard anomalous individualized sensor data. In block 320, the building automation application server 102 may validate the individualized sensor data received from the mobile computing devices 104 using fixed sensor data received from the fixed sensors. For example, the building automation application server 102 may use the fixed sensors to determine the expected limits for particular measurements.

In block 322, the building automation application server 102 transmits the building system configuration to the building controller 106. The building controller 106 configures, programs, or otherwise controls the building systems 108 to implement the building system configuration. For example, the building controller 106 may establish temperature setpoints for various parts of the building 110. The building automation application server 102 may use any appropriate technique for transmitting the building system configuration to the building controller 106, such as transmitting a command using the network 114 or transmitting a command using a direct communication link with the building controller 106.

In block 324, the building automation application server 102 transmits feedback to the mobile computing devices 104 based on the building system configuration determined as described above. In some embodiments, in block 326, the building automation application server 102 transmits the feedback data to the collection server 112, from which the feedback data is retrieved by the mobile computing devices 104. In block 328, in some embodiments the building automation application server 102 transmits building system configuration information as part of the feedback data. For example, the building automation application server 102 may transmit information indicating changes made to the building system configuration based on individualized sensor data provided by the mobile computing device 104. Providing feedback on the building system configuration may motivate users to continue to provide individualized sensor data and otherwise engage with the system 100. In some embodiments, in block 330 the building automation application server 102 may transmit user reward information to the mobile computing devices 104. User reward information may be embodied as any reward or other incentive that may encourage users to provide individualized sensor data and otherwise engage with the system 100. For example, the user reward information may be embodied as discounts for certain services provided in the building 110. After transmitting feedback to the mobile computing devices 104, the method 300 loops back to block 304 to continue processing individualized sensor data received from the mobile computing devices 104.

Figure 4:
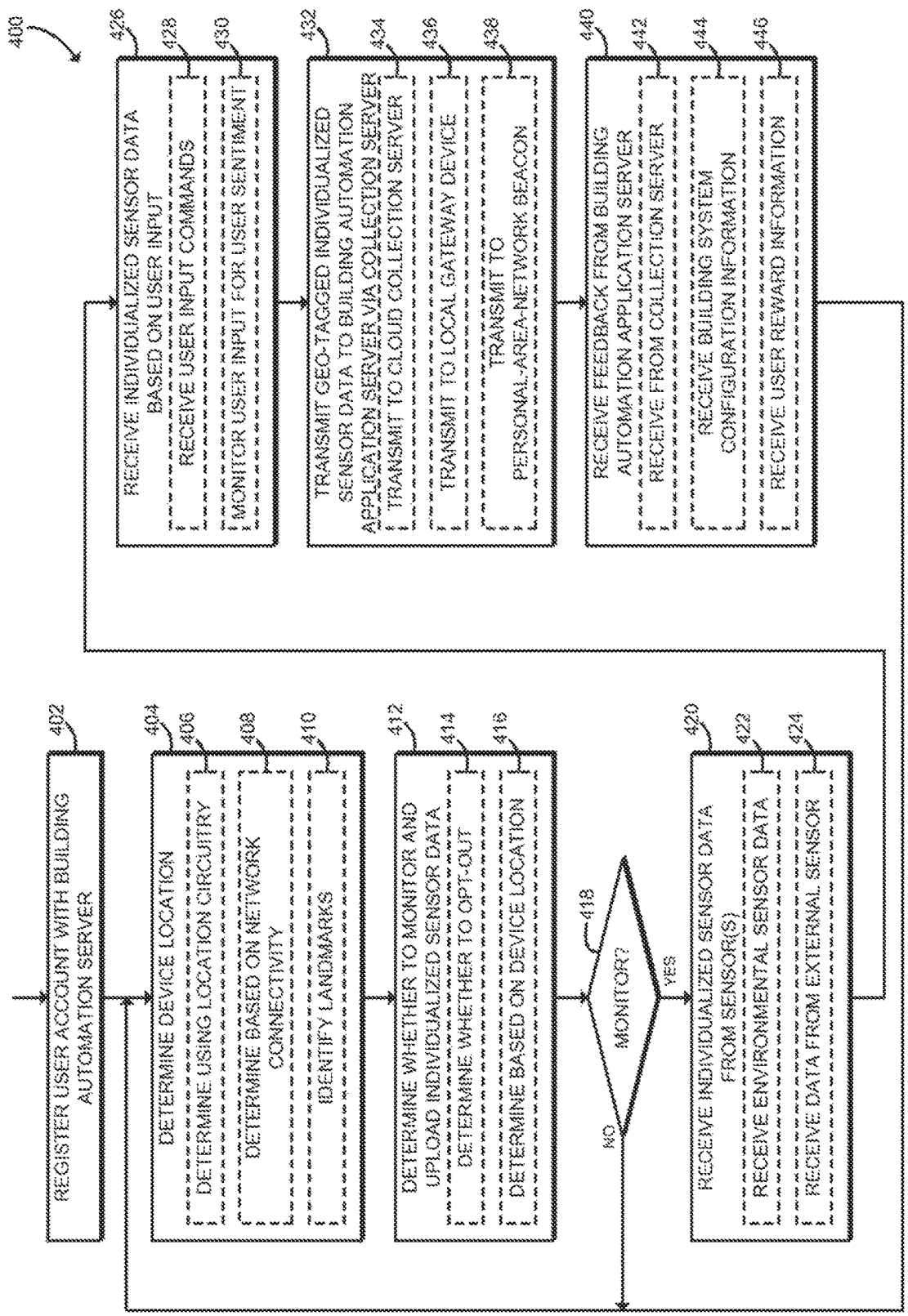
FIG. 4 is a simplified flow diagram of at least one embodiment of a method for individualized building automation that may be executed by a mobile computing device of the system of FIGS. 1 and 2.

Referring now to FIG. 4, in use, a mobile computing device 104 may execute a method 400 for individualized building automation. The method 400 begins with block 402, in which the mobile computing device 104 registers a user account with the building automation application server 102. As described above, the mobile computing device 104 may transmit privacy preferences associated with the user account to the building automation application server 102. For example, the privacy preferences may indicate whether the user has agreed to a privacy policy or opted out of providing sensor data to the building automation application server 102.

In block 404, the mobile computing device 104 determines its location. The mobile computing device 104 may use any technique or combination of techniques for determining device location. In some embodiments, in block 406 the mobile computing device 104 may determine the device location using the location circuitry 150. For example, the mobile computing device 104 may determine coordinates of the device location using a GPS receiver or similar location circuitry. In some embodiments, in block 408 the mobile computing device 104 may determine the device location based on available network connectivity. For example, the mobile computing device 104 may determine whether one or more wireless networks associated with the building 110 are accessible. In block 410, the mobile computing device 104 may determine the device location by identifying one or more landmarks near the mobile computing device 104. The mobile computing device 104 may, for example, monitor sensor data such as image data provided by a camera of the mobile computing device 104 to identify landmarks within the building 110. As another example, the mobile computing device 104 may monitor audio input data or other user input data for references to landmarks within the building 110. Continuing that example, the mobile computing device 104 may monitor user input for text messages identifying landmarks such as, "I'm by the fountain" or "At the main entrance."

In block 412, the mobile computing device 104 determines whether to monitor and upload individualized sensor data to the building automation application server 102. In some embodiments, in block 414, the mobile computing device 104 may determine whether the user has opted out of providing the individualized sensor data. The mobile computing device 104 may make that determination based on user privacy preferences, security settings, or other policy settings associated with the mobile computing device 104 and/or the current user. In some embodiments, in block 416, the mobile computing device 104 may determine whether to upload the individualized sensor data based on the device location. For example, the mobile computing device 104 may only upload the individualized sensor data when the mobile computing device 104 is located at the building 110. Of course, in some embodiments the mobile computing device 104 may upload individualized sensor data when the mobile computing device 104 is away from the building 110. For example, building safety systems 108 may benefit from knowing which mobile computing devices 104 are away from the building 110 in the event of a fire or other emergency. Additionally, although illustrated as determining whether to monitor and upload the individualized sensor data, it should be understood that in other embodiments the mobile computing device 104 may make those determinations separately. For example, in some embodiments the mobile computing device 104 may monitor the individualized sensor data locally without uploading the individualized sensor data to the building automation application server 102.

In block 418, the mobile computing device 104 checks whether to monitor the individualized sensor data. If not, the method 400 loops back to block 404 to continue monitoring the device location. If the mobile computing device 104 determines to monitor the individualized sensor data, the method 400 advances to block 420.

In block 420, the mobile computing device 104 receives individualized sensor data from one or more of the sensors 152. The individualized sensor data may be embodied as any data that may be used to control the building systems 108. For example, the individualized sensor data may be used as a parameter, input, or other reference to one or more control algorithms. In some embodiments, in block 422 the mobile computing device 104 receives environmental sensor data from the sensors 152. The environmental sensor data may include data indicative of the environment of the mobile computing device 104, such as audio data, visual/camera data, temperature data, humidity data, light level data, or other environmental data. In some embodiments, in block 424 the mobile computing device 104 may receive sensor data from an external sensor device such as a thermostat, humidity sensor, or other external environmental sensor. The mobile computing device 104 may communicate with the external sensor device using a personal area network technology such as Bluetooth® Low Energy.

In block 426, the mobile computing device 104 receives individualized sensor data based on user input. The individualized sensor data may include user input or may be generated from user input received by the mobile computing device 104. In some embodiments, in block 428 the mobile computing device 104 may receive user input commands providing the individualized sensor data. For example, the mobile computing device 104 may receive preferences or settings input by the user into a building automation application. In some embodiments, in block 430 the mobile computing device 104 may monitor user input for user sentiment that indicates the user's comfort level. For example, the user may input text that indicates the user's current comfort level (e.g., entering a text message stating, "It's too cold in here"). The mobile computing device 104 may parse or otherwise analyze the user input to determine the user sentiment, or the mobile computing device 104 may transmit the user input to the building automation application server 102 for analysis.

In block 432, the mobile computing device 104 transmits geo- and time-tagged individualized sensor data to the building automation application server 102 via the collection server 112. As described above, the individualized sensor data is geo-tagged, meaning that it includes or is otherwise associated with geographical data indicating the location of the mobile computing device 104. The geographical data may indicate the location of the mobile computing device 104 at any appropriate resolution. For example, in some embodiments, the geographical data may indicate whether the mobile computing device 104 is located at or within the building 110. Additionally or alternatively, the geographical data may identify particular rooms, zones, or other areas within the building 110. In some embodiments, the building automation application server 102 may fine-tune the geographical data using data from other sensors to more accurately determine the location of the mobile computing device 104. In some embodiments, in block 434 the mobile computing device 104 may transmit the individualized sensor data to a cloud collection server 112. The cloud collection server 112 may be embodied as a web server, a cloud server, or other server accessible to the mobile computing device 104 and the building automation application server 102 using a public network such as the Internet. In some embodiments, in block 436, the mobile computing device 104 may transmit the individualized sensor data to a collection server 112 that is embodied as a local gateway device or other computing device accessible to the mobile computing device 104 using a local area network associated with the building 110. In some embodiments, in block 438 the mobile computing device 104 may transmit the individualized sensor data to a personal area network beacon device such as a Bluetooth® Low Energy beacon. Transmitting the individualized sensor data to using a personal area network protocol may avoid transmitting data over one or more wireless networks and thus may reduce power consumption and/or data transmission costs for some users.

In block 440, the mobile computing device 104 receives feedback data from the building automation application server 102 in response to transmitting the individualized sensor data. The mobile computing device 104 may present the feedback data to the user, for example by displaying the feedback information in a building automation application. In some embodiments, in block 442, the mobile computing device 104 may receive the feedback data from the collection server 112, which in turn received the feedback data from the building automation application server 102. In some embodiments, in block 444 the mobile computing device 104 may receive building system configuration information as part of the feedback data. For example, the mobile computing device 104 may receive information indicating changes made to the building system configuration based on the individualized sensor data provided by the mobile computing device 104. Providing feedback on the building system configuration and actions taken may motivate the user to continue to provide individualized sensor data and otherwise engage with the system 100. In some embodiments, in block 446 the mobile computing device 104 may receive user reward information from the building automation application server 102. User reward information may be embodied as any reward or other incentive that may encourage the user to provide individualized sensor data and otherwise engage with the system 100. For example, the user reward information may be embodied as discounts for certain services provided in the building 110. After receiving feedback, the method 400 loops back to block 404 to continue monitoring individualized sensor data.

In some embodiments, wearable activity trackers are employed. Recently, wearable activity trackers have become more popular in consumer the electronic industry. An activity tracker is a device or application for monitoring and tracking fitness-related metrics such as distance walked or ran, calorie consumption, and in some cases heartbeat, quality of sleep and even GPS location. Such fitness-related data on activity trackers can be also synced with smartphones or computers wirelessly. Some examples of wearable activity trackers include Fitbit HR, Garmin Vivofit, Microsoft Band and Apple Watch, among others. These activity trackers have sensors that directly sample a user's bodily physical information. For example, the Microsoft Band has the following sensors that are used to collect activity data: an optical heart rate monitor, a GPS, an ambient light sensor, a galvanic skin response sensors, a skin temperature sensor, a three-axis accelerometer, a gyroscope, a microphone, a capacitive sensor and a UV sensor. Several of these sensors are directly related to the user's comfort, wherein the user is an occupant inside a building. For example, an optical heart rate sensor can be used to detect physical needs, e.g., oxygen, metabolism, sleep. GPS sensors can be used to detect location, in or out of the building. Galvanic skin response sensors can be used to detect sweating. Skin temperature sensors can be used to detect the temperature directly felt or sensed by the user. Accelerometer and gyroscope sensors can be used to detect activity intensity. The activity data provided by some or all of the sensors is used in some embodiments to determine user or occupant comfort in various BAS zones within building 110. The activity data is related to the comfort levels of the building's occupants.

Some, many or all of the sensors in wearable activity trackers are directly related to building occupancy's comfort level and physical needs. Such sensors can provide precise information for quantifying the comfort of the building's occupants, and for adjusting the building control to improve the degree of comfort of the building 110 occupancy. By pairing activity sensors with smart devices, including but not limited to smartphones and building automation systems, some embodiments may provide a comprehensive platform enabling human-in-the-loop, occupant-centric building automation.

Referring to FIGS. 5-8, some embodiments relate to automatic control in a building automation system 101 (BAS 101), e.g., employing building automation application server 102, the automatic control including but not limited to, HVAC control. In some embodiments, building occupants or users 107 employ mobile computing devices 104 in the form of wearable activity trackers 104A, which provide real time or logged occupancy activity data for occupancy comfort detection and quantification. This activity data may be used as feedback for automatic control by BAS 101 of building systems 108, e.g., HVAC control by building controller 106 under the direction of BAS 101, e.g., building automation application server 102.

The wearable activity trackers 104A (e.g. Fitbit, Microsoft Band, etc.) are becoming more popular and are typically worn by the users or building occupants 107 all the time. The wearable activity trackers 104A directly collect data, e.g., activity data, which is the output of some or all of the aforementioned sensors in the activity trackers 104A and in some embodiments, in smartphones 104B. The activity data is related to occupants' 107 comfort and health, and includes biological data provided by the activity tracker 104A sensors, such as heart rate, sweat, activity intensities and skin temperature. These activity trackers 104A are also wirelessly coupled to, e.g., paired with, mobile computing devices 104 in the form of smartphones 104B, hence enabling more flexible connectivity and intelligence. The coupling may be, for example, via a paired Bluetooth connection. In some embodiments, wearable activity trackers 104A may not include location circuitry 150, in which case the location circuitry 150 of smartphone 104B is relied upon for determining the occupants' location within building 110, e.g., to determine the BAS zones that the occupants 107 are located in. In other embodiments, wearable activity trackers 104A may include location circuitry 150. Smartphones 104B include location circuitry 150. Once the location of activity tracker 104A and/or smartphone 104B is determined, activity tracker 104A and/or smartphone 104B, depending upon the embodiment, transmits the location data to BAS app 103.

In some embodiments, a BAS application, i.e., a software application (BAS app 103) operating on building automation application server 102 and a smartphone app e.g., a software application (smartphone app 105) operating on smartphones 104B are employed. Each user's smartphone app 105 is registered, e.g., by the user 107, with BAS app 103. This registration allows communications between each smartphone 104B and BAS 101, and provides a channel for smartphone app 105 to provide data to BAS app 103, e.g., a report including a comfort value and a user 107 location.

Smartphone app 105 collects wearable activity tracker 104A activity data, quantifies the user's 107 comfort according to a comfort model, and anonymously sends the data in a report to BAS app 103, e.g., in the form of a comfort value (in some embodiments, the report also includes user 107 location data). BAS app 103 then adjusts the building system 108 (e.g., the HVAC system) based on feedback from one or more occupants 107, such as adjusting the ventilation and/or temperature set-point. In some embodiments, wearable activity trackers 104A for registered users 107 are coupled to BAS 101, e.g., via BAS app 103 and smartphones 104B, enabling direct interaction between the building occupants or users 107 and building 110, directly and anonymously using occupants' 107 comfort as feedback in BAS control using an architecture that enables such control via smartphones 104B and BAS app 103. In some embodiments, a sensor fusion and weighted voting system is employed that adapts to the user's 107 activity pattern to control building systems 108, e.g., HVAC, automatically.

Figure 5:
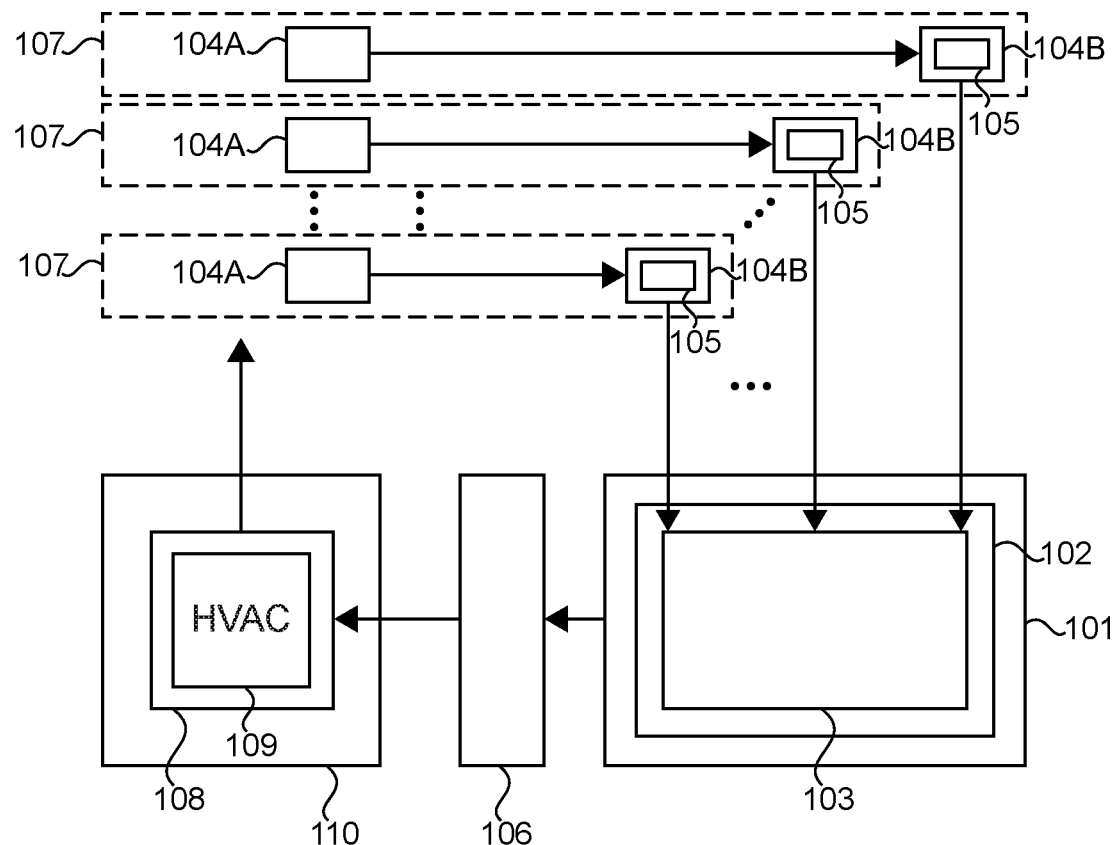
FIG. 5 schematically illustrates some aspects of a non-limiting example of a system for controlling comfort in a building having a heating, ventilation and air conditioning system.

With reference to FIG. 5, the activity data is tracked by wearable activity trackers 104A for each user 107 that has registered with BAS app 103, and the data is logged onto the user's 107 paired smartphone 104B at a desired, e.g., predetermined time interval (e.g. every 10 minutes).

On smartphone 104B, for each user 107, smartphone app 105 collects the activity data from the corresponding activity tracker 104A, and calculates a comfort value based on a comfort model (e.g., such as a comfort value in the form of a perceived mean vote, or PMV according to ASHRAE Standard 55). Ambient BAS zone data not available from onboard smartphone 104B sensors may be provided by the BAS 101 or a zone-level management system. The smartphone app 105 sends a report containing the comfort value, anonymously, to BAS app 103 at a desired, or predetermined, time interval (e.g. every 10 minutes), constituting a "vote" for a certain BAS action. In some embodiments, the user 107 may send the report containing the comfort value at any desired time. For example, smartphone app 105 may create and send a machine-generated comfort value at predetermined time intervals, whereas a user 107 may use smartphone app 105 to enter and send a user-selected or user-generated comfort value at any desired time.

Figure 6:
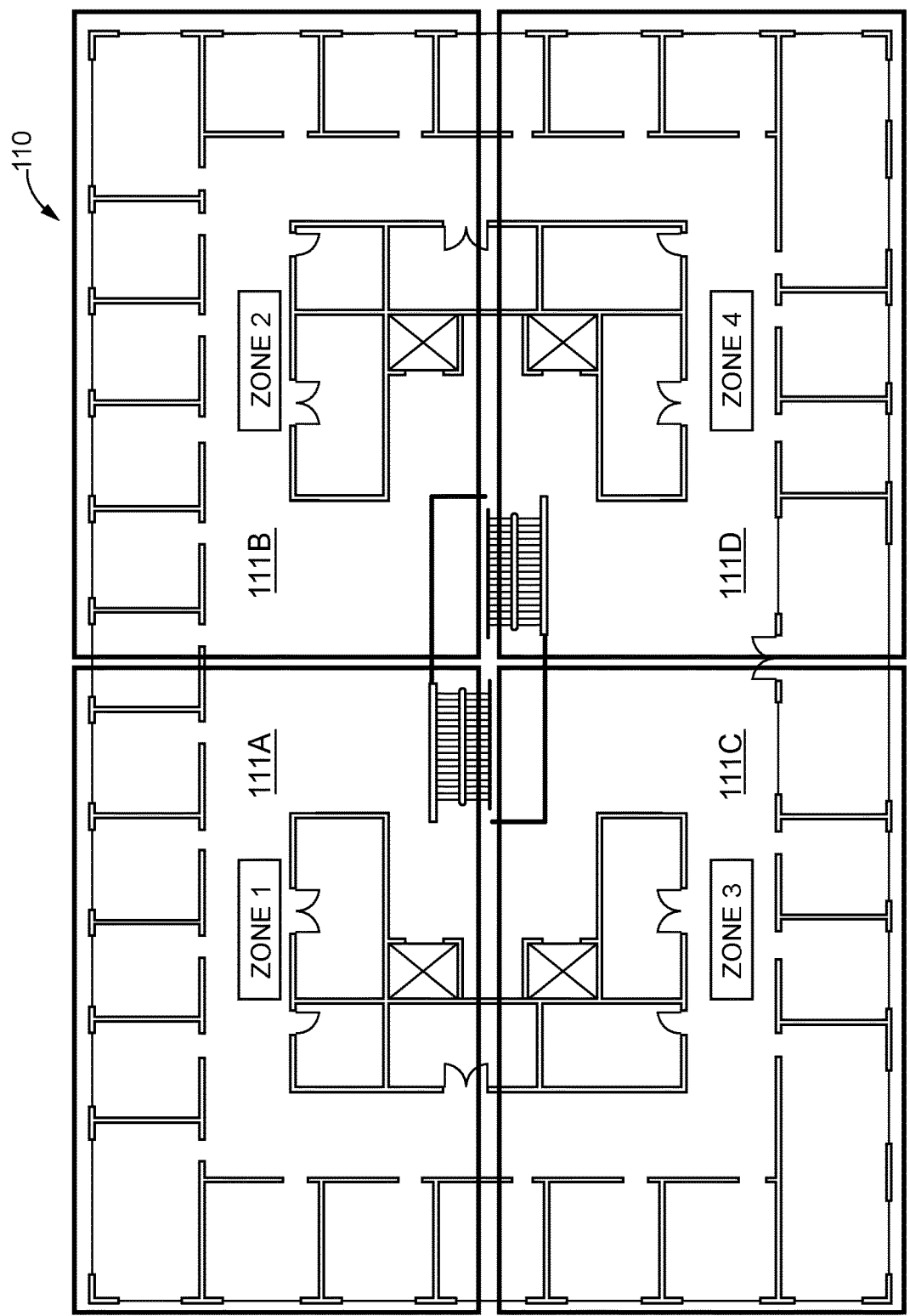
FIG. 6 illustrates some aspects of a non-limiting example of a building having building automation system zones that may be employed in accordance with an embodiment of the present invention.

As illustrated in FIG. 6, building 110 is subdivided into BAS zones, e.g., BAS zones 111A, 111B, 111C and 111D, wherein building systems 108 can individually control conditions in each BAS zone, e.g., heating, cooling, ventilation, lighting, etc. Generalized and anonymous indoor location information can be gathered using location circuitry 150, e.g., in smartphone 104B, e.g., GPS or external sensors by smartphone app 105 to coordinate votes within specified BAS zones. Smartphone 104B transmits a report of its location to BAS app 103 and its vote (comfort value). Alternatively, a user 107 may interface with the smartphone app 105 to provide a manual location indication within the BAS zones, verify the comfort model "vote" (comfort value) transmitted from their devices as indicative of their preference, or override their machine-determined comfort model vote (comfort value) with a manual preference input to the on-screen application of smartphone app 105 for transmission from smartphone 104B to BAS app 103. Smartphone app 105 then indicates feedback to the user 107, such as action taken, time to implement a change resulting from voting, or indication of overall voting results within the area (e.g., within the BAS zone where the user or occupant 107 is located).

On the BAS side, BAS app 103 receives the comfort score (value) and location of each user 107 registered with the BAS app 103. BAS app 103 also determines a comfort estimate for each BAS zone to use as a baseline or when no user information is available. This estimate is based on measurements of temperature, humidity, etc. in the BAS zone, e.g., using fixed sensors, as well as assumptions about occupant 107 activity, clothing, etc., e.g., which may be programmed by the facility manager or commissioning engineer. Each comfort score (value) and BAS zone estimate is given (e.g., multiplied by) a certain weight value, with more relevant scores receiving higher weight values. The weighted scores or comfort values are then summed and divided by the total number of weight values in order to determine the comfort index for the BAS zone. In the event that there is confusion about the comfort level in the BAS zone, such as widely divergent reported comfort values, then the BAS app 103 may send a push notification to the building occupants' 107 wearable activity trackers 104A and/or smartphones 104B to request additional information, e.g., may push a request to the users 107 (e.g., via activity trackers 104A and/or smartphones 104B) to provide more information, which may include an updated comfort value or vote, or updated detailed measurement data, e.g., such as skin temperature or other sensed data, in order to determine a better estimate of the comfort value for the particular BAS zone. In some embodiments, the requested additional information may include a manual vote, i.e., a comfort value manually supplied by the users/occupants.

Once the comfort value for the BAS zone has been estimated, BAS app 103 uses this input to adjust the HVAC setpoints, e.g., via building controller 106, within the BAS zone in order to achieve a comfort target. The larger the difference between the reported comfort value and the comfort target, the more aggressive will be the HVAC response. An example would be PID control of HVAC using comfort values at feedback.

In some embodiments, smartphone app 105 collects, anonymizes and transmits activity tracker 104A data, e.g., in the form of a machine-generated comfort value, to BAS 101, where BAS app 103 carries out data analytics and automation control.

On the smartphone 104B side, it will be understood that most activity tracker 104A vendors provide software development kits (SDKs) that enable third parties to develop smartphone 104B apps to interact with their activity trackers, such as Fitbit's Developer API, Microsoft's Band SDK, and Garmin's Device Interface SDK, to name a few. Using these SDKs, a smartphone app 105 can be developed that will pull data from various different activity trackers 104A. On the other side, such smartphone app 105 can also connect to BAS 101 via the BAS' interface, such as Wi-Fi in the building, or cloud based BAS via web services, e.g. the oBIX protocol.

On the BAS side, BAS middleware, such as ABB's Newron-System or other BAS middleware, can provide a platform for collecting data, performing analytics and carrying out control. The BAS App 103, in some embodiments, functions as an adapter that collects the activity data from smartphone apps 105. Then, the BAS App 103 uses the activity tracker 104A data to perform analysis and optimization, and adjust the controls of building systems 108, such as an HVAC system 109.

The comfort of building occupants 107 itself is an important factor in the field of building automation systems. Examples of thermal comfort models that may be used in some embodiments include ASHRAE Standard 55, which can be used to adjust building 110 control to ensure occupancy 107 comfort. The ASHRAE model, called perceived mean vote (PMV), relates many measurements of zone and personal conditions to an estimated "vote" of comfort (e.g., the comfort value). In some embodiments, PMV is a function of ambient temperature, air speed, humidity, radiant temperature, metabolic rate, and clothing insulation. The PMV may be, for example, a vote value from −3 to +3, where −3 is cold, 0 is ideal, and +3 is hot.

The use of activity trackers 104A enables precise PMV estimates unique to individual occupants 107, allowing for much more effective control of building systems 108, e.g., HVAC system 109, in particular. Votes from various occupants 107 may be processed to determine a BAS action, such as raising or lowering the HVAC system 109 temperature set point. Also, the use of PMV allows personal condition measurements to be anonymized to ensure privacy, e.g., by reporting only PMV values to a BAS or HVAC controller, not individual measurements, in some embodiments. In one embodiment, the smart phone 104B and/or activity tracker 104A collects data about the individual user/building occupant 107 through direct measurements pertaining to the individual user 107, and measurements pertaining to the room by communicating with the BAS app 103. The user's 107 device (e.g., smartphone 104B) then processes this data (e.g., obtained from wearable activity tracker 104A via smartphone app 105) to determine the user's 107 comfort index (e.g., PMV value of −3 to +3). In some embodiments, only this index is reported to the BAS, which anonymizes the comfort data, and which protects sensitive information about the user 107, such as health status.

Activity trackers 104A are closely related to the Internet of Things (IoT) industry, where connectivity is ubiquitous and enables increased interactions of connected devices with other devices and services. Most wearable activity trackers 104B are at least capable of wirelessly connecting to smartphones 104B. In some embodiments, the wearable activity trackers 104A are able to both send tracked metrics and sensor measurements to smartphone 104B, and in some embodiments to receive information for smartphone 104B. In some embodiments, activity trackers 104A can directly connect to Wi-Fi and/or other networks, e.g., for transmitting activity or other data to BAS 103, and in some embodiments have a robust operating system and hardware environment comparable to a smartphone 104B.

In some embodiments, an "activity tracker+smart phone" setup is employed, e.g., wherein activity tracker 104A is paired to a smartphone 104B via a dedicated low power wireless communication scheme, such as Bluetooth, BluetoothSmart (also known as Bluetooth Low Energy), 6LoW-PAN, etc., and provides sensor data to smartphone 104B. Smartphone 104B provides an intelligence and communication platform constructed to process the sensor data received from wearable activity tracker 104A, e.g., using smartphone app 105, as well as to connect to a wide area network such as the Internet or an intranet or another network. In some embodiments, smartphone 104B is the platform that collects and processes the activity tracker 104A data, e.g., using smartphone app 105, communicates with the BAS and interacts with the user 107.

Some embodiments may include self-sufficient activity trackers 104A that have sufficient processing power to calculate comfort metrics on the activity trackers 104A. In some embodiments, activity trackers 104A may report comfort values and/or location data to BAS 103. In some embodiments, activity trackers 104A may report or interact with an IoT wireless gateway, e.g., utilizing Bluetooth, Bluetooth Smart, Wi-Fi, ZigBee, or other communication means to transmit the comfort data to BAS 101, e.g., to BAS app 103. In some embodiments, BAS 101 is the platform that uses these data for building control 106, with possible incorporation of a wireless gateway, room or zone automation controller, or another bridging platform to mediate the connection between smart phone, activity tracker, or cloud service and the BAS 101 or BAS app 103. This bridging platform may either be incorporated within the BAS 101 hardware or provided externally.

The use of smartphone 104B as an intermediary between the activity tracker 104A and the BAS, e.g., BAS 101 and/or BAS app 103, in some embodiments, provides processing power for control and decision making, as well as one or more wireless communication options. Examples of applications enabled by these features of some embodiments of smartphone 104B may include advanced data processing and anonymization of activity tracking metrics, localization options of the user comfort level data within the control BAS zones, e.g., BAS zones 111A, 111B, 111C and 111D, and the incorporation of user 107 preferences and two-way user 107 interaction with the BAS, e.g., BAS 101 and/or BAS app 103. Some wearable activity trackers 104B do not provide GPS or location information, or use such information in limited fashion, e.g., to preserve battery life of wearable devices. In some embodiments where activity tracker(s) 104B do not provide adequate location information, smartphone 104B would serve as the primary facilitator of anonymized location-based information. In addition, smartphone 104B could help provide indoor location information that may indicate a general zone in which to apply HVAC system 109 or other control system set point changes. This indoor location could be implemented either passively by means of smartphone sensors and wireless signals, or as an actively selected region input by the user 107 on a smartphone 104B application, such as smartphone app 105. Various options exist for passive indoor location determination, including GPS, trilateration of existing wireless signals based on received signal strength indicators (RSSI), placement of wireless beacon signals (for example, Bluetooth or RFID signal beacons) at spaced intervals, choke point or geo-fencing radio-frequency identification techniques providing zone entrance and exit estimates, and inertial measurement from step tracking and device camera or position sensors.

Figure 7:
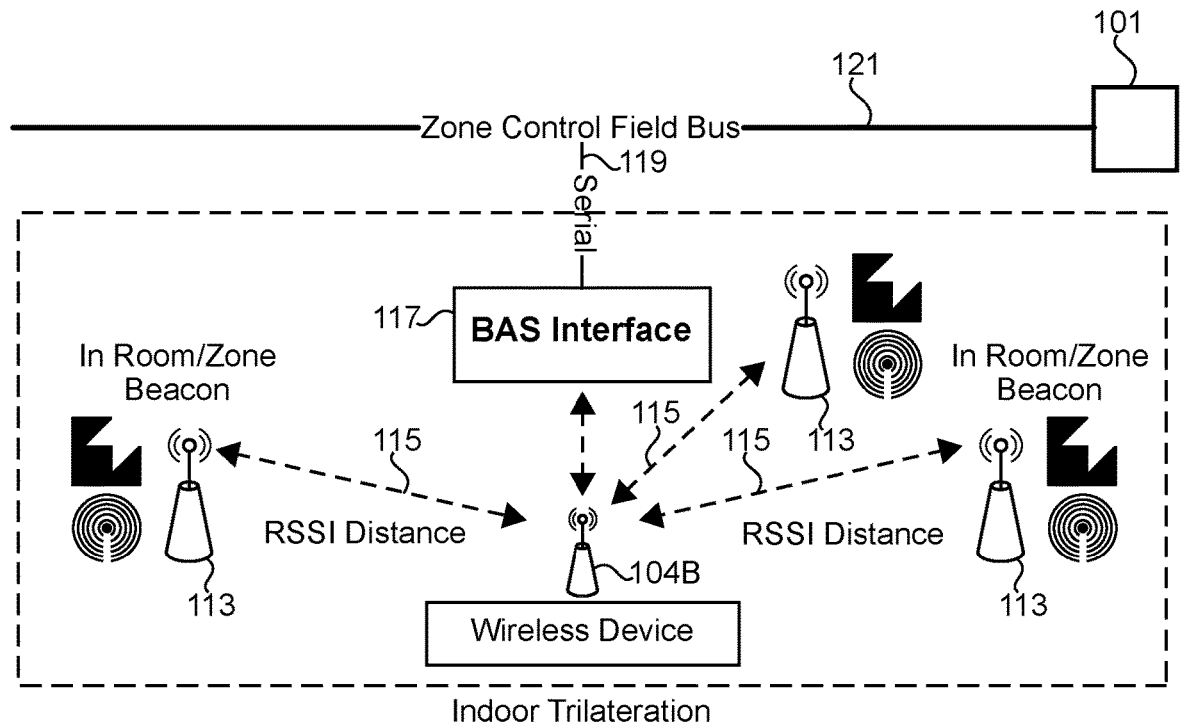
FIG. 7 schematically illustrates some aspects of a non-limiting example of a system for determining indoor location of a building occupant using trilateration in accordance with an embodiment of the present invention.

Referring to FIG. 7, some aspects of a non-limiting example of indoor location determination in accordance with an embodiment of the present invention are illustrated. In the embodiment of FIG. 7, BAS app 103 (FIG. 5) segregates or subdivides the building into a plurality of designated BAS zones. In such embodiments, each BAS zone, e.g., of BAS zones 111A-111D (FIG. 8) and/or any other BAS zones in the particular application, includes a beacon 113. Indoor trilateration, for example, is used to provide localization of smartphone 104B and/or wearable activity tracker 104A to obtain location data. In some embodiments, one or more rooms within each BAS zone may have a dedicated beacon 113. The location of the wireless device, e.g., smartphone 104B or in some embodiments of wearable activity tracker 104A may be based on distances 115 from beacons 113 determined by received signal strength indicators (RSSI) of the beacons 113 and/or the wireless device 104 (104A and/or 104B), which may communicate the location information to a BAS interface 117, e.g., coupled to BAS 101, e.g., via a serial connection 119 to a zone control field bus 121 coupled to BAS 101. One or more of various communications systems or protocols may be used, e.g., low energy systems or protocols, such as Wi-Fi, BLE (Bluetooth Low Energy), Near Field Communications (NFC) and/or Radio Frequency Identification (RFID).

Figure 8:
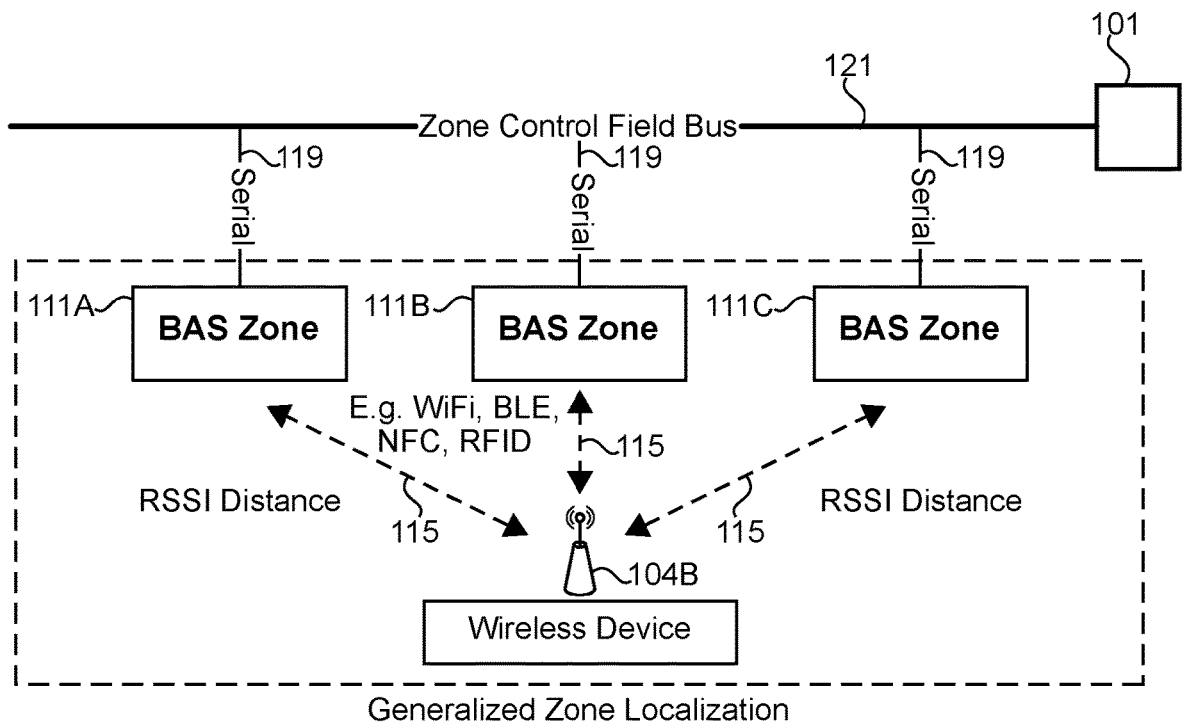
FIG. 8 schematically illustrates some aspects of a non-limiting example of a system for determining indoor location of a building occupant based on a generalized zone localization in accordance with an embodiment of the present invention.

Referring to FIG. 8, in some embodiments, a manual user 107 input or overriding of the automated location estimate within smartphone app 105 may be employed to locate smartphone 104B or in some embodiments wearable activity tracker 104A, e.g., a generalized zone location, within a certain BAS zone, such as one of BAS zones 111A, 111B, 111C and/or other BAS zones or a proximity to a BAS zone based on one or more of various communications systems or protocols, e.g., low energy systems or protocols, such as Wi-Fi, BLE (Bluetooth Low Energy), Near Field Communications (NFC) and/or Radio Frequency Identification (RFID).

In some embodiments, smartphone app 105 may provide two-way interaction with BAS 101, e.g., via BAS app 103 and building automation application server 102 typically offered only at control panels or provided to the system maintainer. In some embodiments, smartphone app 105 includes provision for users 107 to adjust information relevant to their comfort model estimate, such as amount of clothing worn and/or biometric data (e.g., height, weight, etc.). In some embodiments, if a user 107 overrides the passively determined comfort value (e.g., the machine determined comfort value determined by smartphone 104B and smartphone app 105, e.g., a PMV or comfort level information and enters their own value), the smartphone app 105 in some embodiments may provide feedback to the user such as the action taken by the BAS, time to implement a change resulting from voting, or an indication of overall voting results within the area, e.g., the BAS zone, that the user is occupying. Once again, the location is determined by the user's 107 device either from user 107 input or by collecting information from external sources, and then this location is reported to the BAS, e.g., BAS app 103. This protects the user's 107 privacy, enables improvement in location technologies through simple software updates, and provides a backup to determine location by soliciting user 107 input if the automatic methods are inadequate to pinpoint the user's location.

In some embodiments, BAS app 103 is operative to send a push notification to the user/occupant 107 to request more information. In various embodiments, the requested information may include detailed measurement data, such as skin temperature or heart rate, or a request for a manual vote. This additional data is opt-in, in order to protect the occupant's 107 privacy. The data may be anonymized. This information can be used to commission the system, to resolve ambiguity about the actual comfort in a zone (such as if two reports contain widely divergent comfort estimates), and/or for other purposes.

In some embodiments, the cumulative comfort in one or more BAS zones is determined using a weighted voting system, e.g., one or more BAS zones having a plurality of occupants 107 therein. The weighted voting may be based on, for example, reports transmitted from a plurality of building occupants' 107 smartphones 104B to BAS app 103. In some embodiments, the zone itself first estimates the comfort value using measurements of temperature, humidity, air speed, and occupancy, if available, as well as programmed assumptions about occupant 107 activity, clothing insulation, and any measurements, which in some cases might not be available, e.g., due to lack of sensors. The programmed assumptions are provided, for example, either by the commissioning engineer or the facility manager. The zone itself gets one vote or weight value. Reports from occupants 107 get two or more weight values for their votes to reflect their improved accuracy relative to the zone's comfort estimates. If the report from the occupant 107 was generated or transmitted within a recent predetermined period of time (e.g., within a short time window prior to being received by BAS app 103, such as within the previous ten minutes) in some embodiments, that report or vote (e.g., the reported comfort value) gets at least one more weight value than a report generated prior to the predetermined period of time, therefore yielding a higher weight for the report or vote generated within the predetermined period of time. The length of the time window may vary with the needs of the application. If the comfort value report is an override, indicating that it was manually created and sent by the occupant 107 rather than being machine-generated from measurements, it is presumed that this report or vote more accurately represents the occupant's 107 desires for the zone, and thus gets at least one more weight value, e.g., all other things being the same, as compared to a machine-generated report, e.g., a machine-generated comfort value, thus yielding a higher weight for the manually generated comfort value or report. In some embodiments, all votes from the same report have the same value. The value of all of the weighted votes are then summed and divided by the total number of weight values in the zone. This provides a mean estimate of comfort for the zone, with weighted preference given to occupant 107 experience, occupant 107 expressed desire, and more recent activity, e.g., as set forth above.

In some embodiments, once the comfort in a zone has been estimated, e.g., based on a weighted average of the reported comfort values, the HVAC system 109 settings for that zone are adjusted in order to push the comfort of the zone toward some target value. For example, based on ASHRAE Standard 55, total PMV (e.g., a weighted average PMV) is preferably within the range of −0.5 to +0.5, with 0 being the ideal target. The HVAC system 109 settings might be zone temperature, air column temperature, fan speed, or vent openness. The magnitude of the change in these settings will become higher, the higher the error between the estimated zone comfort, e.g., based on reported comfort values, and in some embodiments, the zone's vote, and the zone comfort value target.

Some embodiments, in contrast to existing systems, thus directly measure the building occupancy's physiological data, and use these data to adjust the BAS to achieve the desired comfort level for the building occupancy.

In some embodiments, in contrast to existing systems, locating the comfort modeling and location determination calculations on the occupant's device helps to protect the occupant's privacy.

In some embodiments, in contrast to existing systems, automatically reading the occupant's comfort reduces the risk of data loss if the occupant decides to stop responding to requests for information. In some embodiments, in contrast to existing systems, push notifications, meanwhile, enable more detailed information to be collected when needed. In some embodiments, in contrast to existing systems, this feedback about HVAC response also promotes user engagement.

In some embodiments, in contrast to existing systems, the weighted voting system incorporates zone building sensors to ensure that there is some degree of comfort model available even if no activity tracker data is available for the zone.

In some embodiments, in contrast to existing systems, the weighted voting system incorporates multiple data sources in a way that prioritizes the most relevant reports.

Embodiments of the present invention include a method for a building automation system (BAS) to control a comfort level in a building, comprising: tracking a activity data relating to a building occupant using a wearable activity tracker; coupling a smartphone associated with the building occupant to the wearable activity tracker; collecting the activity data from the wearable activity tracker using a smartphone app operating on the smartphone; determining a comfort value using the smartphone app based on the activity data; transmitting a report of the comfort value to a building automation system app from the smartphone; and controlling an output of a heating, ventilation and/or air conditioning system based on the comfort value.

In a refinement, the method further comprises registering the smartphone with the BAS app.

In another refinement, the comfort value is transmitted anonymously.

In yet another refinement, the method further comprises determining a location the building occupant, and transmitting the location to the BAS app.

In still another refinement, the determining the comfort value includes the building occupant overriding a machine-determined comfort value and manually entering a desired comfort value.

In yet still another refinement, the activity data includes biological data.

In a further refinement, the method further comprises the BAS app sending a push notification to the building occupant's wearable activity tracker and/or the building occupant's smartphone to request additional information.

In a yet further refinement, the requested additional information includes a manual vote.

In a still further refinement, the BAS app segregates the building into a plurality of designated BAS zones in the building, further comprising performing weighted voting for at least one BAS zone having a plurality of building occupants, wherein a plurality of smartphones are associated with the plurality of building occupants; and wherein the weighted voting is based on reports transmitted from the plurality of smartphones to the BAS app.

In a yet still further refinement, a report transmitted within a recent predetermined period of time has a higher weight than a report generated prior to the predetermined period of time.

In another further refinement, a report transmitted based on a manually entered comfort value receives a higher weight than a report based on a machine-determined comfort value.

Embodiments of the present invention include a system for controlling comfort in a building having a heating, ventilation and/or air conditioning (HVAC) system, comprising: a plurality of smartphone apps constructed to operate on a corresponding plurality of smartphones, each smartphone being constructed to couple to a corresponding wearable activity tracker worn by a building occupant of a plurality of building occupants, wherein each smartphone app is constructed to receive activity data from the corresponding wearable activity tracker and determine a comfort value for the building occupant based on the activity data, yielding a plurality of comfort values; and a building automation system having a BAS app constructed to receive the comfort values from the plurality of smartphone apps via the corresponding smartphones and constructed to control the HVAC system based on the comfort values to improve the aggregate comfort of the building occupants.

In a refinement, each comfort value is in the form of a Perceived Mean Vote (PMV).

In another refinement, the smartphone app is constructed to transmit a location of a corresponding building occupant to the BAS app.

Embodiments of the present invention include a method for controlling the comfort level in a building, comprising: subdividing the building into a plurality of zones; obtaining data related to the comfort levels of at least some occupants in each zone from wearable activity trackers worn by the occupants; transmitting the data to smartphones coupled to the wearable activity trackers for at least some occupants in each zone; determining comfort values for the at least some occupants in each zone; transmitting the comfort values to a building automation system; and controlling a building system output for each zone based on the comfort values associated with each zone.

In a refinement, the building system output for each zone is controlled based on a weighted average of the comfort values associated with each zone.

In another refinement, the building system is a heating, ventilation and/or air conditioning system.

In yet another refinement, the comfort values for the at least some occupants in each zone are determined by a smartphone app.

In still another refinement, the comfort values for the at least some occupants in each zone are transmitted to the building automation system by smartphones.

In yet still another refinement, the method further comprises the building automation system sending a push notification requesting information from selected occupants in the building.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system for controlling comfort in a building having a heating, ventilation and/or air conditioning (HVAC) system, comprising:
   a multi-tier communication architecture, wherein
      a first tier of the multi-tier communication architecture is constructed for communication between a wearable activity tracker and a smartphone,
      the first tier of the multi-tier communication architecture wirelessly transmits an activity data from the wearable activity tracker and wirelessly receives the activity data at the smartphone,
      a second tier of the multi-tier communication architecture is constructed for communication between the smartphone and a building automation system (BAS), and
      the second tier of the multi-tier communication architecture wirelessly transmits a comfort value from the smartphone and wirelessly receive the comfort value at the BAS;
   the multi-tier communication architecture including:
   a plurality of smartphone apps constructed to operate on a corresponding plurality of smartphones, each smartphone being constructed to couple to a corresponding wearable activity tracker worn by a building occupant of a plurality of building occupants, wherein each smartphone app is constructed to receive activity data transmitted from the corresponding wearable activity tracker and to determine the comfort value for the building occupant based on the activity data, yielding a plurality of comfort values; and
   the building automation system having a BAS app and constructed to:
      (1) receive the comfort values from the plurality of smartphone apps via the corresponding smartphones,
      (2) determine a comfort estimate at a location of each of the plurality of building occupants, the comfort estimate based at least in part on one or more pre-programmed assumptions of the building occupants,
      (3) determine, from the comfort values and the comfort estimate, a comfort index, and
      (4) control the HVAC system based on the comfort index.

2. The system of claim 1, wherein each comfort value is in the form of a Perceived Mean Vote (PMV).

3. The system of claim 1, wherein the smartphone app is constructed to transmit the location of a corresponding building occupant to the BAS app, and wherein the pre-programmed assumptions relate to an activity of the corresponding building occupant.

4. A method for controlling a comfort level in a building, comprising:
   subdividing the building into a plurality of zones;
   obtaining data related to the comfort levels of at least some occupants in each zone of the plurality of zones from wearable activity trackers worn by the occupants, wherein the data includes a skin temperature measured by the wearable activity trackers;
   communicating, for at least some occupants in each zone, the data from the wearable activity trackers to a smartphones associated with the occupant;
   determining a comfort values for the at least some occupants in each zone based on the data received from corresponding wearable activity trackers;
   communicating the comfort values to a building automation system;
   determining, for each zone, a comfort estimate, the comfort estimate being based at least in part on one or more pre-programmed assumptions of the building occupants;
   applying a weighted value to the comfort values and the comfort estimates, a value of the applied weighted value being different for at least some of the comfort values and/or the comfort estimates;
   determining, from an average of the weighted comfort values and the weighted comfort estimates, a comfort index for each zone;
   controlling a building system output for each zone based on the comfort index associated with each zone.

5. The method of claim 4, wherein the one or more pre-programmed assumptions comprises an assumption of the clothing worn by the occupants.

6. The method of claim 4, wherein the building system is a heating, ventilation and/or air conditioning system, and wherein the one or more pre-programmed assumptions comprises an assumption of an activity of the occupants.

7. The method of claim 4, wherein the comfort values for the at least some occupants in each zone are determined by a smartphone app.

8. The method of claim 4, wherein the comfort values for the at least some occupants in each zone are transmitted to the building automation system by smartphones.

9. The method of claim 4, further comprising the building automation system sending a push notification requesting information from selected occupants in the building.

10. A method for a building automation system (BAS) to control a comfort level in a building, comprising:
   tracking activity data relating to a building occupant using a wearable activity tracker;
   collecting, by a smartphone, the activity data from the wearable activity tracker;
   determining, using a smartphone app on the smartphone, a comfort value of the building occupant based on the activity data;
   communicating, from the smartphone, a report of the comfort value to a BAS app;
   determining, by the BAS app and via use of at least data from one or more fixed sensors of the building and one or more pre-programmed assumptions of the building occupant, a comfort estimate for a location in the building;
   determining from the comfort value and the comfort estimate, a comfort index; and
   adjusting an output from at least one of a heating, ventilation and/or conditioning system based on the comfort index.

11. The method of claim 10, further comprising registering the smartphone with the BAS app.

12. The method of claim 10, wherein the one or more pre-programmed assumptions comprises at least one of a clothing and an activity of the building occupant.

13. The method of claim 10, further comprising determining a location of the building occupant, and transmitting the location to the BAS app.

14. The method of claim 10, wherein the determining the comfort value includes the building occupant overriding a machine-determined comfort value and manually entering a desired comfort value.

15. The method of claim 10, wherein the activity data includes biological data.

16. The method of claim 10, further comprising the BAS app sending a push notification to the wearable activity tracker and/or the smartphone to request additional information.

17. The method of claim 16, wherein the requested additional information includes a manual vote.

18. The method of claim 10, wherein the BAS app segregates the building into a plurality of designated BAS zones in the building, further comprising performing weighted voting for at least one BAS zone having a plurality of building occupants, wherein a plurality of smartphones are associated with the plurality of building occupants; and wherein the weighted voting is based on reports transmitted from the plurality of smartphones to the BAS app.

19. The method of claim 18, wherein a report transmitted within a recent predetermined period of time has a higher weight than a report generated prior to the predetermined period of time.

20. The method of claim 18, wherein a report transmitted based on a manually entered comfort value receives a higher weight than a report based on a machine-determined comfort value.

21. The method of claim 10, further comprising sensing a skin temperature of the building occupant using a skin temperature sensor of the wearable activity tracker, wherein the activity data includes the skin temperature.

* * * * *